United States Patent
Mittleman

(10) Patent No.: US 9,290,893 B2
(45) Date of Patent: Mar. 22, 2016

(54) ROADWAY PAVING SYSTEM

(71) Applicant: Advant-Edge Paving Equipment, LLC, Loudonville, NY (US)

(72) Inventor: Gary Mittleman, Loudonville, NY (US)

(73) Assignee: Advant-Edge Paving Equipment, LLC, Loudonville, NY (US)

( * ) Notice: Subject to any disclaimer, the term of this patent is extended or adjusted under 35 U.S.C. 154(b) by 37 days.

(21) Appl. No.: 14/248,051

(22) Filed: Apr. 8, 2014

(65) Prior Publication Data

US 2014/0301782 A1     Oct. 9, 2014

Related U.S. Application Data

(60) Provisional application No. 61/809,714, filed on Apr. 8, 2013.

(51) Int. Cl.
    *E01C 19/48*      (2006.01)

(52) U.S. Cl.
     CPC ............. *E01C 19/48* (2013.01); *E01C 2301/20* (2013.01)

(58) Field of Classification Search
     CPC .................................. E01C 19/48; E01C 23/06
     See application file for complete search history.

(56) References Cited

U.S. PATENT DOCUMENTS

| | | | | |
|---|---|---|---|---|
| 3,680,451 A | * | 8/1972 | Birtchet | 404/104 |
| 3,965,822 A | * | 6/1976 | Stewart | 104/7.2 |
| 4,181,449 A | * | 1/1980 | Lenker | 404/87 |
| 4,489,658 A | * | 12/1984 | von Beckmann | 104/12 |
| 6,273,636 B1 | * | 8/2001 | Johanpeter | 404/104 |
| 8,491,221 B1 | * | 7/2013 | Hedin | 404/96 |
| 8,496,399 B2 | | 7/2013 | Mittleman | |
| 8,591,142 B2 | * | 11/2013 | Mittleman | 404/98 |
| 2002/0106243 A1 | * | 8/2002 | Rahn et al. | 404/96 |
| 2014/0212217 A1 | * | 7/2014 | Wagner et al. | 404/118 |
| 2015/0078824 A1 | * | 3/2015 | Haro | 404/96 |

OTHER PUBLICATIONS

Carlson Paving Products, Inc., a Subsidiary of Astec Industries Inc.; Safety Edge "Safely Paving the Way"; brochure; Tacoma, Washington; downloaded on Apr. 7, 2014; 2 pages.

Pavement Design Guide: Placement, Section 7: Placement; http://onlinemanuals.txdot.gov/txdotmanuals/pdm/placement.htm as located on Apr. 8, 2014; pp. 1-16.

\* cited by examiner

*Primary Examiner* — Abigail A Risic
(74) *Attorney, Agent, or Firm* — Trop, Pruner & Hu, P.C.

(57) ABSTRACT

An embodiment comprises a first plate coupled to a second plate via a first joint having a first axis of rotation; and a resilient member, coupled to the first plate, including a downward bias directed along a vertical line of force orthogonal to the first axis of rotation; wherein (a) the second plate is configured to at least one of (a)(i) couple to a pavement shoe, and (a)(ii) include a lower surface that comprises a pavement shoe, (b) the resilient member, the first and second plates, and the first joint are configured to simultaneously: (b)(i) rotate the second plate about the first axis of rotation from a non-horizontal position to a horizontal position, and (b)(ii) move the first joint vertically along the line of force; and (c) the first joint is to move vertically and rotate independently of both a screed and an end gate. Other embodiments are described herein.

25 Claims, 7 Drawing Sheets

ROADWAY PAVING SYSTEM

This application claims priority to U.S. Provisional Patent Application No. 61/809,714 filed on Apr. 8, 2013 and entitled "Device coupled to a paving machine to shape asphalt", the content of which is hereby incorporated by reference.

BACKGROUND

The present invention relates generally to the field of roadway paving equipment and more specifically to the field of pavement-shaping devices.

As used herein, "pavement" refers to any material—including, without limitation, asphalt concrete, Portland cement concrete, hot mix asphalt (HMA), warm mix asphalt (WMA), soil, or gravel—laid down to create a roadway or over a pre-existing roadway. As used herein, "roadway" refers to any surface on which a paving machine (paver) may be driven including, without limitation, streets, roads, highways, driveways, bicycle paths, jogging paths, runways, and unpaved road beds. As used herein, "paving" refers to the process of laying down pavement.

In a wide variety of applications, pavement-shaping devices are used to produce a desired shape at the edge of a paved roadway. Often, the desired shape provides a ramp to allow vehicles to more easily and more safely regain the roadway after inadvertently driving off the edge. In other instances the paved edge of the first of two adjacent lanes can be constructed in such a way that the seam between the two lanes will form a stronger bond.

BRIEF DESCRIPTION OF THE DRAWINGS

Features and advantages of embodiments of the present invention will become apparent from the appended claims, the following detailed description of one or more example embodiments, and the corresponding figures, in which:

FIG. 5 shows the embodiment in a more horizontally deployed position and FIG. 6 shows the embodiment in a more vertically deployed position.

DETAILED DESCRIPTION

Figure 1:
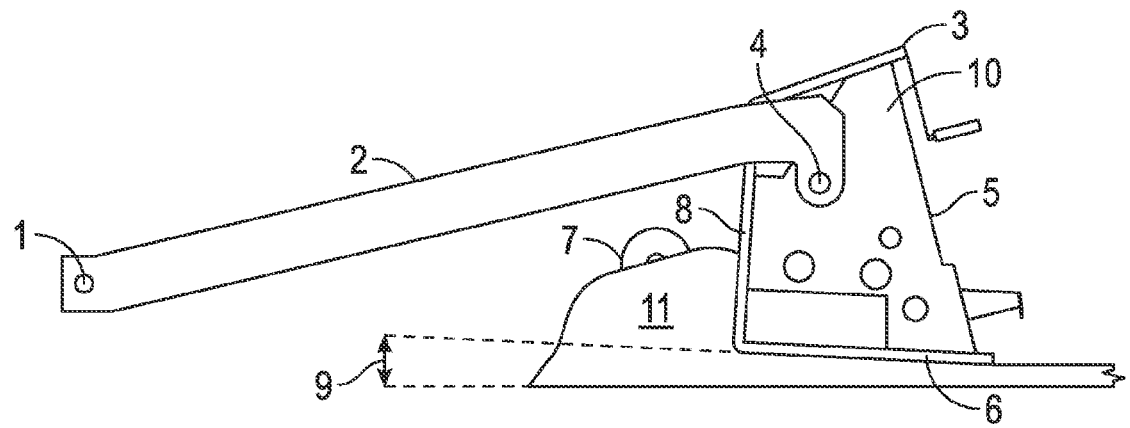
FIG. 1 depicts a conventional screed.

Reference will now be made to the drawings wherein like structures may be provided with like suffix reference designations. The drawings may only show the structures useful to understand the illustrated embodiments. Additional structures known in the art may not have been included to maintain the clarity of the drawings. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner. "Connected" may indicate elements are in direct physical contact with each other and "coupled" may indicate elements co-operate or interact with each other, but they may or may not be in direct physical contact.

Conventional pavement-shaping devices suffer from several disadvantages. A first disadvantage concerns the inability for an operator to vary or adjust the slope of the edge being created. A second disadvantage found on those devices that mount to the screed (as used herein the term "screed" includes the screed extension and the face of the screed or screed extension) concerns the inadvertent flow of material around the edging device. A third disadvantage is the inability of the device to independently (or by itself) follow changes in roadside elevations. A fourth disadvantage is associated with those devices that either attach to or are a part of the end gate. Over time end gates tend to fall out of alignment and are difficult to accurately control. Also, since the end gate is not securely coupled to the screed, devices attached to the end gate will not benefit from the vibratory action of the screed. Thus edge compaction and strength is reduced. A fifth disadvantage is the inability of conventional devices to be "flipped over" so that they can be placed on either side of the paving machine. In this manner the operator does not need to buy a pair (left side and right side) of units if the device can be "flipped" from the right side of the paver to the left side of the paver. A sixth disadvantage is poorly shaped or designed forming shoes that do not aid in compaction or edge smoothing. A shoe benefits from having both a funneling surface for compaction and a troweling surface for smoothing. A seventh disadvantage concerns the wear rate of parts. In many conventional devices, if the edge forming shoe wears out, the entire device must be replaced. Having detachable and replaceable shoes is a benefit to the operator. An eighth disadvantage concerns edgers that operate outside of the end gate. The edging device is unable to maintain sufficiently high temperature without the aid of an external heater. Those units operating inside the end gate are immersed in asphalt and maintain the proper temperature. If the temperature of the edger is too low the edge will often tear as it is being constructed.

More specifically regarding the first and second disadvantages, conventional devices that operate inside the end gate move in one of only two ways: vertically or rotationally (with rotational axis static relative to paving machine). In cases where the devices travel only vertically, such devices are only capable of forming edges or joints at one set angle. As for rotational devices that include a paving shoe that rotates about an axis to accommodate roadway elevation changes, the geometry of such a design allows asphalt to seep between the outmost edge of the device and the end gate (which attaches to the paver screed) leaving a pile of wasted asphalt on the shoulder. The disadvantage can be corrected but it requires the expense of additional components.

An embodiment addresses all of the disadvantages listed herein. In other words, an embodiment does not (in any significant manner) form a gap between the end gate and device and consequently reduces paving material waste and cleanup of such waist. The embodiment is also capable of forming edges of different angles for both the tapered shoulder edge and the longitudinal center lane joint. The embodiment accomplishes this by, for example, moving both vertically and rotationally. After coupling the embodiment to a paving machine, the embodiment can create differently shaped edges and joints by utilizing forming elements (e.g., paving shoes) of different shapes. Due to its ability to both move vertically and rotationally, the embodiment is automatically follows changes in the shoulder (or unpaved) elevation. More specifically regarding the rotational movement, this allows the embodiment to vary the angle of an edge or joint relative to the horizontal plane. This is desirable to counteract the pavement movement that might occur after a pavement roller compacts the surface or to create edges and joints of various slopes and depths. The rotational movement also forms edges of different slopes for both the tapered shoulder edge and the longitudinal center lane joint. For example, the embodiment can produce a 30 degree safety edge (as specified by The U.S. Federal Highway Administration) along the shoulders of roadways to reduce the likelihood of vehicular accidents. Furthermore, many states and municipalities are requiring contractors to create a longitudinal center lane joint or notch wedge joint to enhance safety during construction, improve the quality and life of the road, and reduce accidents during the construction phase. The embodiment can create such and edge.

FIG. 1 depicts a conventional screed 5. The self-leveling screed unit determines the profile of the HMA 11 being placed. The screed takes the head of HMA from the material delivery system, strikes it off at the correct thickness and provides initial mat compaction. Screed plate 6 is the flat bottom portion of the screed assembly that flattens and compresses the HMA. Screed angle (angle of attack) 9 is the angle the screed makes with the ground surface. Strike-off plate 8 is the vertical plate just above the leading edge of the screed used to strike off excess HMA and protect the screed's leading edge from excessive wear (this plate may be part of the screed face). Screed arms 2 are long beams that attach the screed to a tractor unit. Tow point 1 is the point at which the screed arm is attached to the tractor unit. Screed arm couples to the screed at pivot 4. Depth crank 3 is the manual control device used to set screed angle and ultimately, mat thickness. A screed heater (not shown) includes heaters used to preheat the screed to HMA temperature. HMA may stick to a cold screed and cause mat tearing. After the screed has been in contact with the HMA for a short while its temperature can be maintained by the HMA passing beneath it and the heater can be turned off. If the screed is removed from contact with HMA for an extended period of time, it may need to be preheated again before resuming paving. A screed vibrator (not shown) is a device located within the screed used to increase the screed's compactive effort. Screed compaction depends upon screed weight, vibration frequency and vibration amplitude. Screed extensions (not shown) are fixed or adjustable additions to the screed to make it longer. Basic screed widths are between 2.4 m (8 ft.) and 3.0 m (10 ft.). However, often it is economical to use wider screeds or adjustable width screeds. Therefore, rigid extensions can be attached to a basic screed or hydraulically extendable screeds are available for adjustment on the fly. HMA is distributed in front of the screed by auger 7. End plate 10 is the portion of the screed, which often joins the horizontal portion of the screed at a right angel, helps control the width of the mat and prevents the HMA from spreading too widely. The end plate 10 is the barrier on the edge of the screed.

Figure 2:
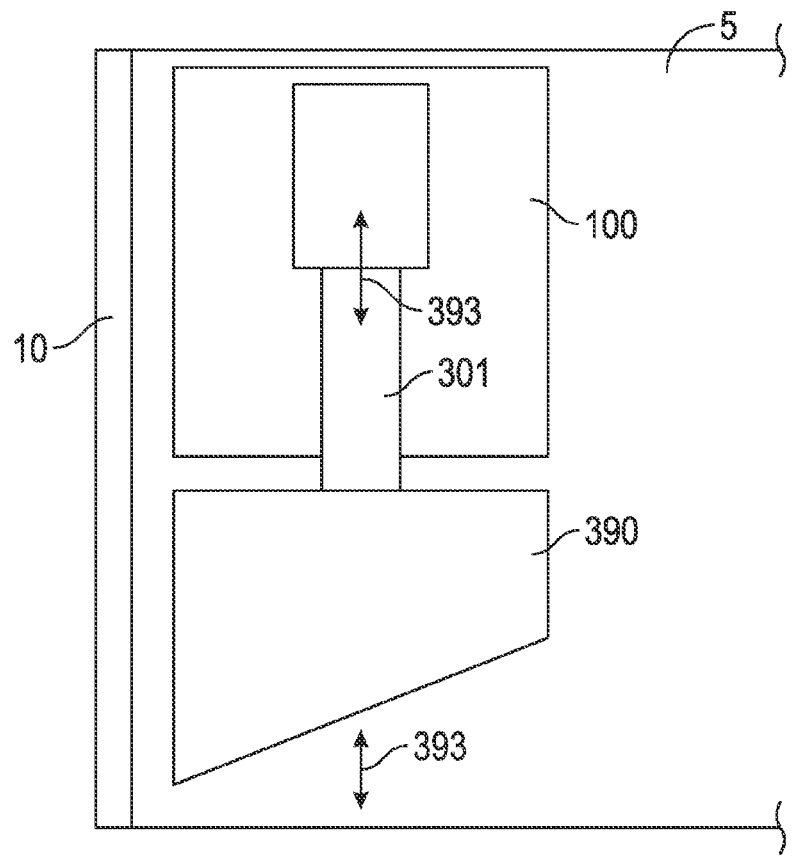
FIG. 2 depicts a conventional pavement shaping device that moves vertically.

FIG. 2 depicts a conventional pavement shaping device that moves vertically. For example, this device is connected to a mounting plate 100. Mounting plate 100 couples to screed 5 adjacent to end gate 10. Guide bar 301 allows paving element 390 to move in an up/down direction 393. This vertical displacement allows for, as an example, a 30 degree shoulder (e.g., "New Jersey Formed Edge"). While the system can move vertically to address changes in road height, curbs, and the like, the system cannot change angles to make, for example, a 25 or 35 degree shoulder. When the system pictured is spring loaded it can independently (by itself and free of the screed and/or end gate) follow changes in shoulder elevation. Other systems do not move independently, but only allow the operator to manually adjust the vertical height for changes in roadside elevation. Many construction specifications require the edger to be independently adjustable.

Figure 3:
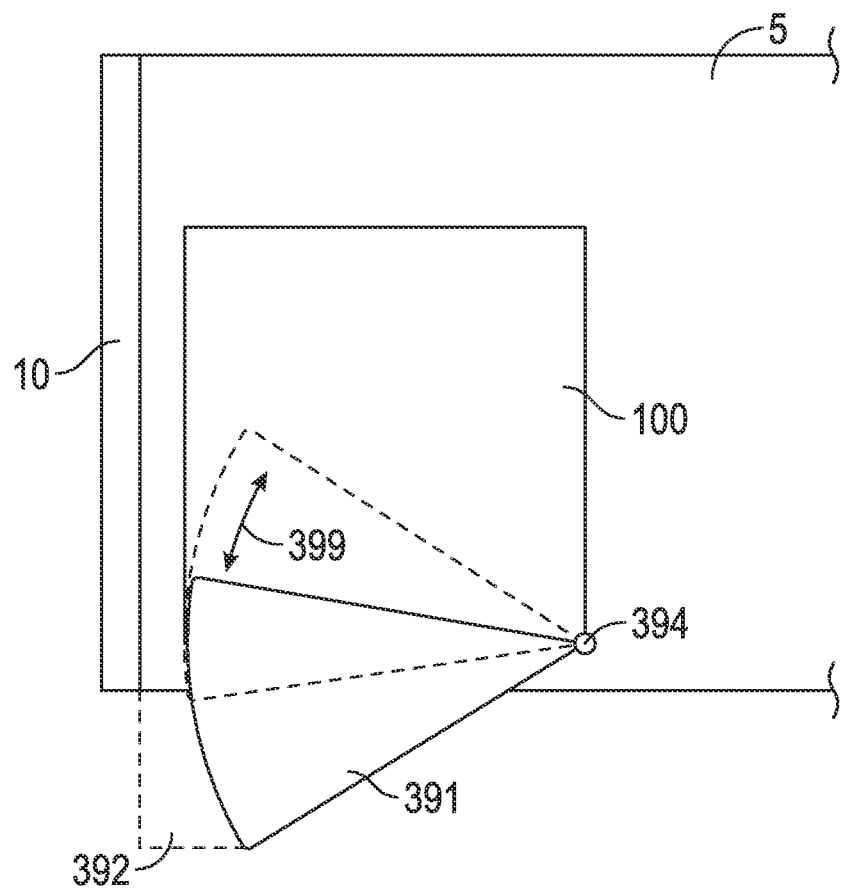
FIG. 3 depicts a conventional pavement shaping device that rotates about an axis.

FIG. 3 depicts a conventional pavement shaping device that rotates about an axis that remains stationary relative to the paving machine (i.e., is not free to move independently of the screed and/or end gate). For example, this device is connected to a mounting plate 100. Mounting plate 100 couples to screed 5 or screed extension adjacent end gate 10. (As used herein, "screed extension" is considered to be a portion of the screed and included as a component of the screed.) Axis or pivot 394 allows paving element 391 to move in a rotational manner 399 about axis 394. There is some vertical displacement of element 391 but the axis 394 itself has no such vertical displacement. As a result, when forming element 391 is in a horizontally displaced position (see dashed line position) there is little room between end gate 10 and element 394. However, when element 391 rotates downwards to fashion a sloped shoulder a space 392 forms between end gate 10 and the outermost edge of element 391. For FIG. 3, as auger 7 moves asphalt from right to left towards end gate 10, some of the asphalt moves past the edge of element 391, but is also not restrained by end gate 10. These leads to a deposit of asphalt into space 392, which results in asphalt waste (which is expensive and is also a burden for the paving crew to clean up).

Figure 4:
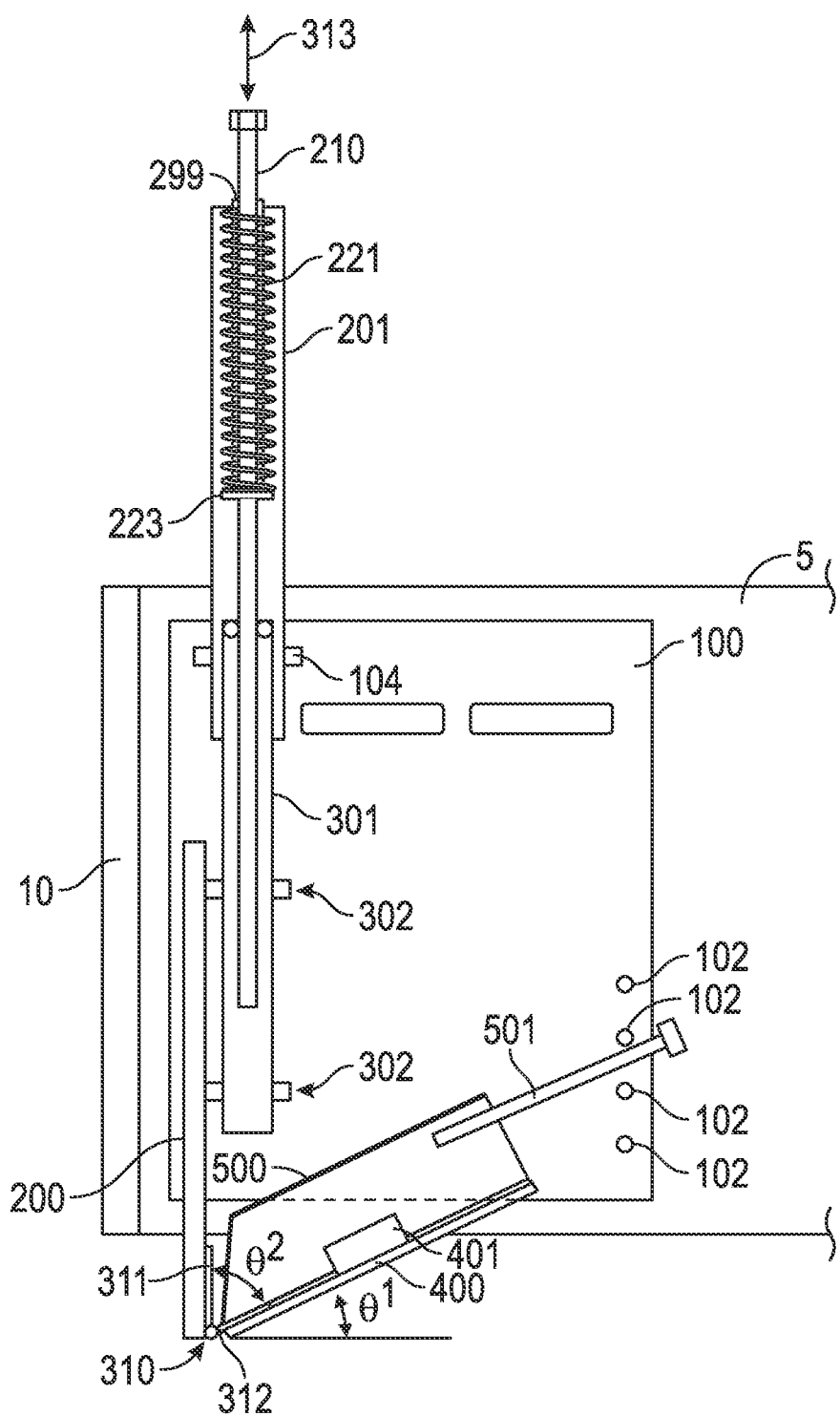
FIG. 4 depicts a pavement shaping device that moves vertically and rotates about an axis in an embodiment of the invention.

FIG. 4 depicts a pavement shaping device attached to the screed extension that moves both rotationally and vertically along a path orthogonal to the rotational axis. An embodiment of the shaping device comprises the following components: mounting plate 100, vertical control assembly (including elements 210, 299, 221, 223, 200, 301), side plate 200, bottom plate 400, backstop plate 500, and forming element 700 (shown in FIG. 5). The device is attached to the paving machine by mechanically attaching the base plate 100 to either screed 5 (or a screed extension). In other embodiments the device may be attached to other parts of the paving machine 2 (e.g., attaching side plate 200 to end gate 10). In FIG. 4 the device is connected to mounting plate 100, which couples to screed 5 adjacent end gate 10.

In an embodiment the device is made of a high strength durable material. In this embodiment the device is made of steel (e.g., ¼ inch plate steel) and steel pipe. Surfaces that are in contact with the HSA 11 may be made of, for example, abrasive resistant steel or a high strength ceramic material. Other embodiments may use different high strength durable material that is also heat resistant to approximately 300 degrees F. or more.

Figure 5:
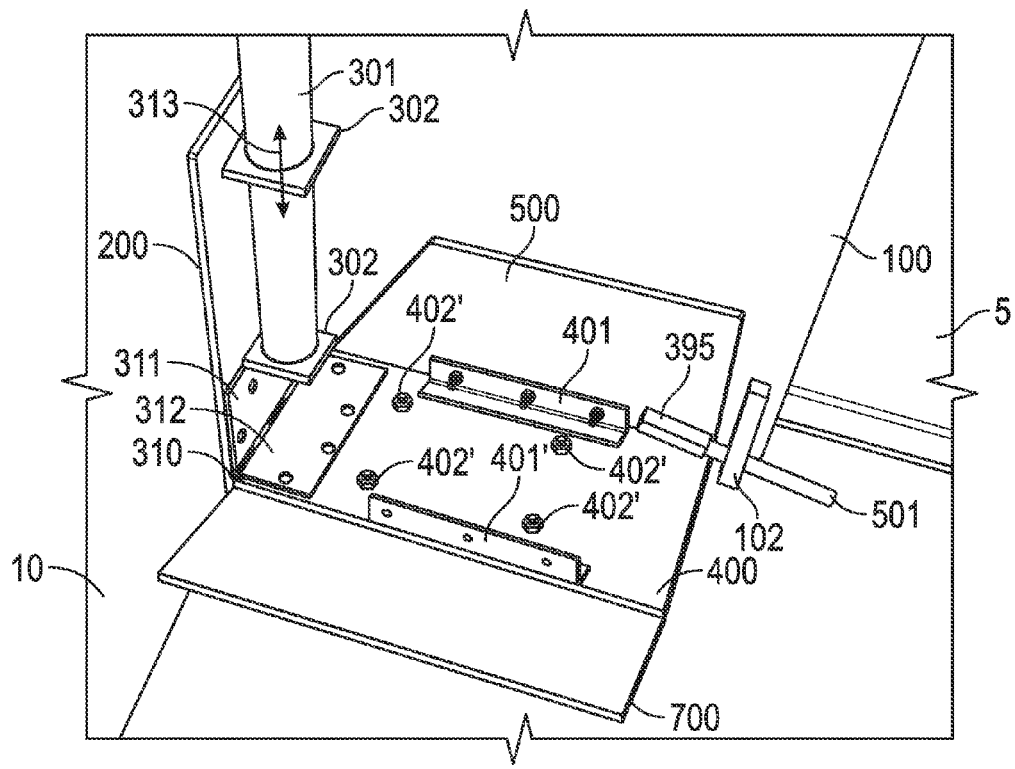
FIGS. 5 and 6 depict a pavement shaping device that moves vertically and rotates about an axis in an embodiment of the invention.
Figure 7:
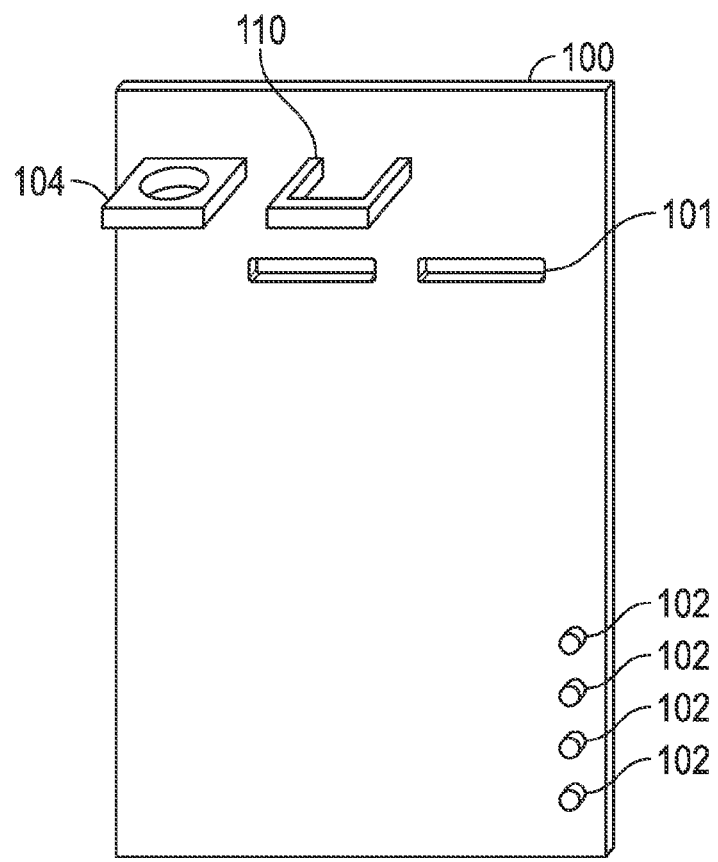
FIG. 7 depicts a mounting plate in an embodiment of the invention.
Figure 9:
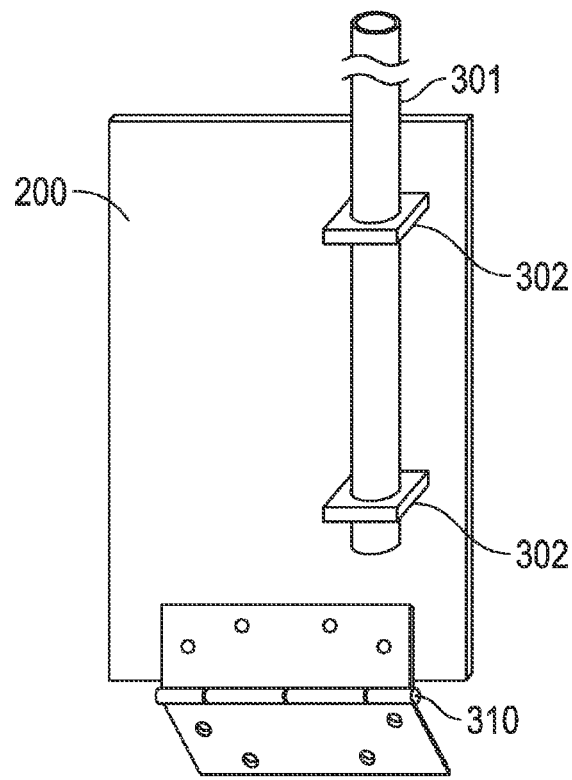
FIG. 9 depicts side plate in an embodiment of the invention.
Figure 10:
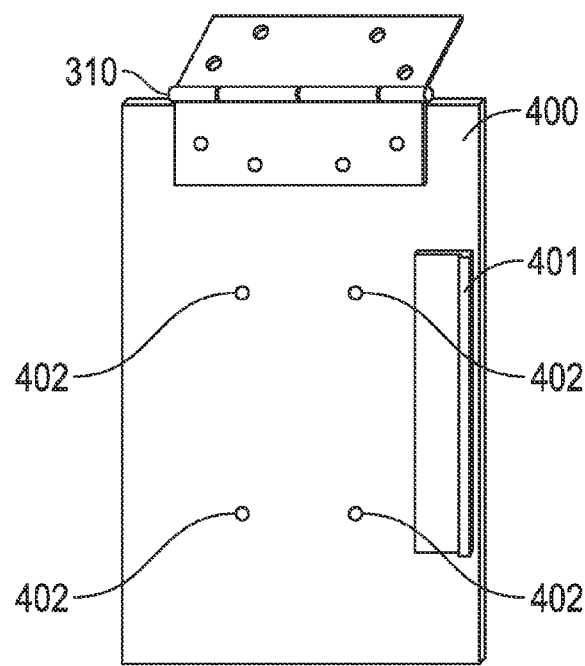
FIG. 10 depicts a bottom plate in an embodiment of the invention.

Mounting plate 100 (see FIGS. 4 and 7) is comprised of mounting holes 101 to mount the plate to screed 5 or elsewhere. Plate 100 also includes depth control pins 102, height adjustment yoke 104, and handle 110. In an embodiment there are two holes 101 shaped as slots so mounting plate 100 may be positioned and leveled upon installation. In other embodiments there may be a different number of holes and hole shapes. There may also be different means of attaching the mounting plate 100 to the paving machine in other embodiments, such as having a threaded rod welded to the mounting plate 100 or tapped and threaded holes put in the mounting plate 100. The Vertical Control Assembly (see FIG. 4) comprises vertical control track 201, vertical adjustment rod 210, and guide bar 301. In an embodiment the vertical control track 201 includes a steel pipe. In an embodiment, the vertical adjustment rod 210 is a threaded rod with a hole near the top through which a cotter pin 299 may be inserted to rod 210 from falling through conduit 201. Rod 210 has a hexagonal shaped top end that a socket wrench can be fitted to. In other embodiments a crank handle may be coupled to the top of the rod. Vertical force components 220 are comprised of a compression spring 221, and a compression disc 223. In an embodiment slide washers are included at the top and bottom of spring 221. The diameters of disc 223 (and slide washers if included) is sized to be slightly less than the inside diameter of the vertical control track 201. In an embodiment, side plate 200 (FIGS. 4 and 9) is comprised of a guide bar 301, coupling Yoke(s) 302. The guide bar 301 includes a steel pipe. In an embodiment side plate 200 is about 5 inches by 10 inches, bottom plate 400 is approximately 5 inches by 10 inches, and back stop plate 500 is approximately 5 inches by 10 inches. In this embodiment 301 has a threaded cap so that when turning 210 the operator can manually raise and lower plate 200. (In other embodiments, the function of side plate 200 may be accomplished by having conduit 301 attach directly to hinge 310. Also side plate 200 may take on a variety of shapes in various embodiments.) In an embodiment, the forming element 700 (FIG. 5), also known as a shoe, comprises a trowel surface, a compaction surface, and a compaction edge(s). In an embodiment the forming element 700 is made of ¼ inch abrasive resistant steel and plate steel. In an embodiment the mounting plate yoke 104, depth control pins 102, and handle(s) 110 are mechanically coupled to the mounting plate 100 (FIG. 7). In an embodiment the vertical control track 201 is mechanically coupled to the mounting plate yoke 104 (FIG. 4). In this embodiment it may be welded on or threaded use a pipe joint thread. In an embodiment the guide bar 301 is mechanically coupled to the side plate 200 via the coupling yokes 302 and it is vertically slide-ably connected to the vertical control track 201 (FIG. 4). In an embodiment the side plate 200 is mechanically coupled to the bottom plate 400 by means of the hinge 310 and hinge plates 311, 312 (FIG. 4). The vertical adjustment rod 210 is coupled to the guide bar 301 in an embodiment by means of a threaded hole. The compression disc 223 is mechanically coupled to the vertical adjustment rod 210. Slide washers, if used, are rotationally slide-ably connected to the compression disc 223 and the compression spring 221 to thereby "book end" the spring and keep the spring in place. The compression spring 221, slide washers (if used) and compression disc 223 are all vertically slide-ably coupled to the vertical control track 201. In an embodiment, the back stop plate 500 is mechanically coupled to the right angle bar 401 (FIG. 8), which in turn is mechanically coupled to the bottom plate 400 (FIGS. 4 and 10). In this embodiment the coupling is with several machine screws and nuts so that the pieces may be disassembled. In an embodiment the guide pin 501 is mechanically coupled to the back stop plate 500 (FIG. 8) and guide pin 501 is slide-ably connected between the depth control pins 102 (FIG. 4). The forming element 700 is mechanically coupled to the bottom plate 400 via holes 402 (FIGS. 5 and 10). In this embodiment they are coupled with several machine screws and nuts so that the pieces may be disassembled.

As shown in FIG. 4, in an embodiment the side plate 200 is only able to move vertically 313. The vertical control track 201 prohibits movement in non-vertical directions. The vertical adjustment rod 210 can raise and lower the side plate 200 when it is threaded in or out of the guide bar 301. The cotter pin 299 placed in the hole in the vertical adjustment rod 210 prohibits the side plate 200 from dropping down below a desired level. The vertical force components (e.g., spring 221, compression disc 223) apply a downward force on the side plate 200. The vertical adjustment rod 210 can be used to increase the downward force on the side plate 200 when the rod is threaded out of the guide bar 301 at a time when the side plate is in its lowest position.

In FIG. 4, hinge 310 enables the angle $\theta^1$ between the horizontal plane (which is orthogonal to the vertically oriented bar 301 and track 201) and bottom plate 400 to change between a range of approximately 0 degrees (when plate 400 is in the raised horizontal position) to 45 degrees (when plate 400 is in the diagonal position and lowered down). Hinge 310 is an example of a joint. A "joint", as used herein, is point at which parts of a structure are joined. A joint may provide for rotation of one body about another body, linear translation of a body along a track, and the like. The range of movement for $\theta^1$ varies in some embodiments based on $\theta^3$ addressed herein. Thus, the range for $\theta^1$ may be between 0-20, 0-30, 0-40, 0-50 degrees and the like in various embodiments.

In FIG. 4, guide pin 501 slides between two of the depth control pins 102. The depth control pins prohibit the bottom plate 400 from moving only vertically with the side plate 200. In other words, as the side plate 200 moves vertically, the bottom plate 400 has a hinged side (side including hinge 310) will move vertically and the bottom plate 400 planar surface will change its angle $\theta^1$ with respect to the horizontal and $\theta^2$ with respect to side plate 200. In another embodiment there is a means to move or relocate the guide pin location attachment. By doing so it allows the operator to adjust the height of the upper side of the edge being formed, which can be important when forming a notch wedge shape.

The forming element 700 (FIG. 5) creates the shaped edge or joint at the shoulder of the road as asphalt passes under it. By changing out the forming element (via fasteners (bolts, screws, etc.) and holes 402), one can create any number of road shapes. Such shapes include, for example, a New Jersey Formed Edge, a Michigan Notch Edge, a Michigan Notch Wedge Joint, a Michigan Plus Shape 22 (with or without "v" groove), a Michigan Plus Shape 22 (with or without longitudinal bumps, a Michigan Plus Shape 22 (with or without horizontal surfaces, a notched wedge joint, a Michigan Joint, a curved or arched surface, and the like.

Embodiments can be fabricated in a metal shop with standard machinery including, but not limited to, welders, drill presses, saws, and the like. Embodiments vary. For example, handle 110, slide washers, and the like may be eliminated. Mounting plate yokes 104 and side plate yokes 302 are just examples of mechanical fasteners/fastening methods. The vertical force assembly (including resilient member (e.g., spring 221) that gives downward force) can be made in a number of ways. For example, instead of a compression spring, an extension spring can be used. Depth control pins 102 and guide pin 501 can be configured to work in unison with a torque spring used at the hinged location.

Figure 11:
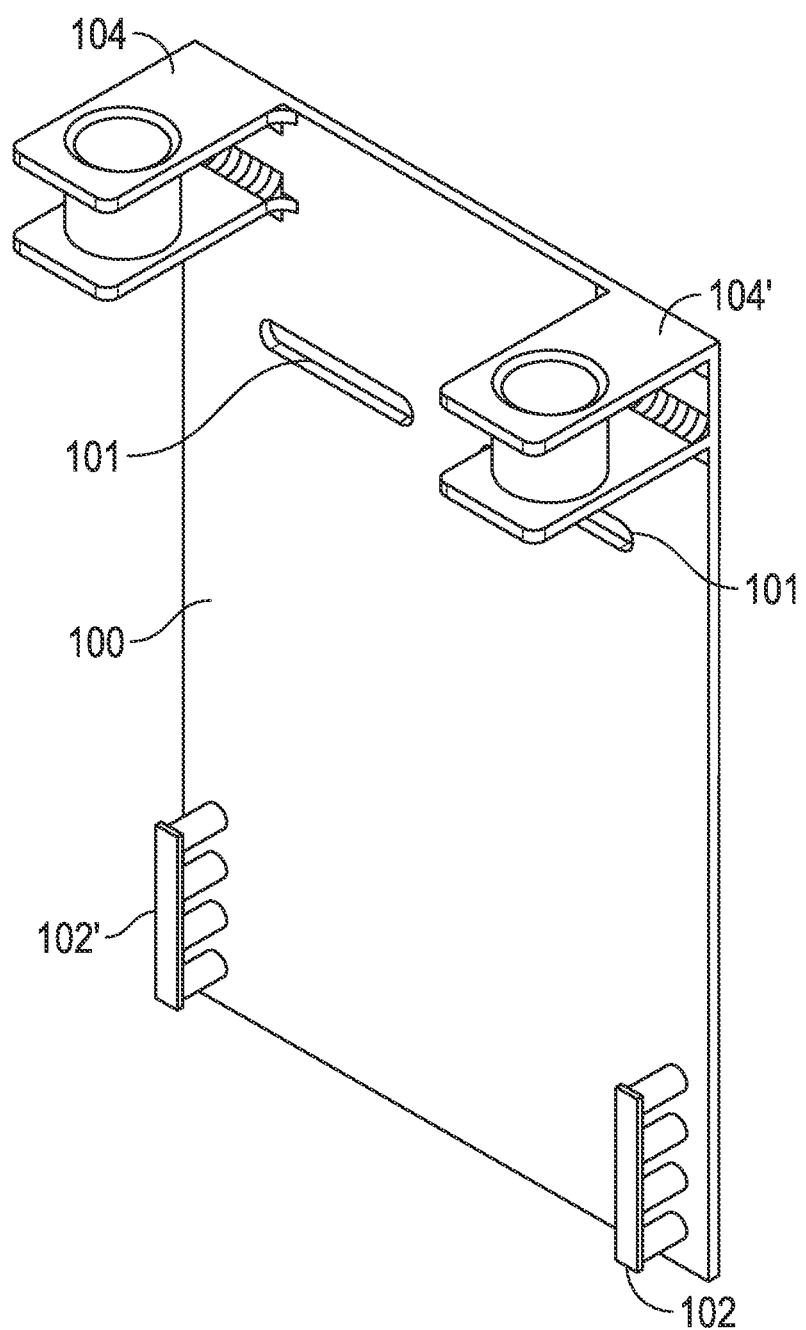
FIG. 11 depicts a mounting plate in an embodiment of the invention.

Embodiments may include various numbers of depth control pins 102 (e.g., 2, 3, 4, 5, 6, 7, 8 or more) to vary angles and heights of deployment for plate 500 (and therefore $\theta^1$ and $\theta^2$). (Note, in FIGS. 5 and 6 pins 102 are partially covered by a forward facing plate.) Mounting plate yoke 104 and back stop plate 500 make it possible to reconfigure the device so it can be mounted on the opposite side of the paving machine. For example, in FIG. 11 pins 102 and yoke 104 are to be used when the device is mounted on the right side of a screed or screed extension and pins 102' and yoke 104' are to be used when the device is mounted on the left side of a screed or screed extension. In this manner, it is possible to configure the device for the left or right side of the paver. As seen in FIG. 5, bracket 401 is used to couple the bottom plate 400 and back plate 500 when the device is on the right side of the screed or screed extension and bracket 401' is used to couple the bottom plate 400 and back plate 500 when the device is on the right side of the screed or screed extension.

In an embodiment, the device (using holes 101 in the mounting plate 100) is bolted onto the screed 5 (or screed extension) in a position next to the end gate 10. The plate should be vertically plumb. Next the screed height is set to the desired paving lift height. The guide pin 501 is then positioned between the two depth control pins 102 that are consistent with the desired depth of the bottom of the forming element 700. The vertical adjustment rod 210 is then turned counter clockwise which lowers the side plate 200 until the forming element 700 makes contact with the ground. Additional turns of the vertical adjustment rod 210 may be desired if the paving operator desires grater downward force on the forming element 700. The paving operation is then ready to begin as far as the device setup is concerned. As the paving machine moves forward and lays down paving material 11, the paving material will flow under the forming element 700 and the desired edge or joint will be shaped.

Should the paving machine go past, for example, a driveway or side street where the shoulder elevation rises, the side plate 200 will independently move vertically up and the forming element 700 will move vertically up. Also, the angle $\theta^2$ between forming element 700 and side plate 200 will increase towards 90 degrees as the forming shoe 700 independently moves up to follow a higher shoulder elevation area. In other words, joint 310 rotates independently of the screed, screed extension, and/or end gate (joint 310 may rotate even if the screed, screed extension, and/or end gate are not moving). Also, joint 310 moves vertically along direction 313 independently of the screed, screed extension, and/or end gate (joint 310 may move vertically even if the screed, screed extension, and/or end gate are not moving). After passing the higher shoulder elevation area, the forming element 700 will return to its original position due to the downward force created by the vertical force components (e.g., spring 221). During the paving process the forming element 700 abuts or almost abuts end gate 10. There is no significant space for paving material 11 to flow between the device and end gate 10 when $\theta^1$ changes (in contrast to area 392 of FIG. 3).

Should a different $\theta^1$ angle be desired, the operator can set the guide pin 501 between two depth control pins 102 that are normally used for a deeper edge or joint (e.g., place pin 501 between uppermost pins 102 instead of lowermost pins 102). Now when the operator lowers the forming shoe 700 to the ground and continues to turn the vertical adjustment rod counterclockwise, the forming shoe 700 will become more inclined relative to the horizontal plane ($\theta^1$ will increase and $\theta^2$ will decrease).

The device can be configured to create a 30 degree safety edge (as specified by certain highway administrations) along the shoulders of roadways to reduce the likelihood of vehicular accidents. Also, many states and municipalities are requiring contractors to create a longitudinal center lane joint or notch wedge joint to enhance safety during construction and to improve the quality and life of the road and the device can be configured to create such an edge.

As shown above, various embodiments can follow changes in roadside elevations. In this manner the operator does not have to manually make adjustments when passing by a driveway or side street. The embodiments also provide a means for the operator to adjust the slope of the edge being constructed. Embodiments offer both these advantages while also being able to attach to a screed or screed extension and not create a gap between the end gate and the forming element as the slope angle increases. The ability for the embodiment to handle this is due at least in part to edge forming element independently moving, simultaneously, both (1) rotationally, and (2) vertically along a path perpendicular to the rotational axis. Both the rotational and vertical movement are relative to the screed and/or end gate (i.e., the embodiment can move vertically independently of whether the screed or end gate is moving vertically).

Unlike many conventional devices, an embodiment of the device does not couple directly to the end gate (instead coupling to the screed/screed extension). Such an embodiment may still be aligned with the screed even if the end gate falls out of alignment. A device coupled to an out-of-alignment end gate is difficult to control. Further, an embodiment couples between the screed and end gate. This is in contrast to conventional devices that couple to the outside of the end gate and are consequently exposed to ambient air temperatures. Such a unit may then require a heating device in order to create a good edge (and the heating device is an undesirable added expense).

Figure 8:
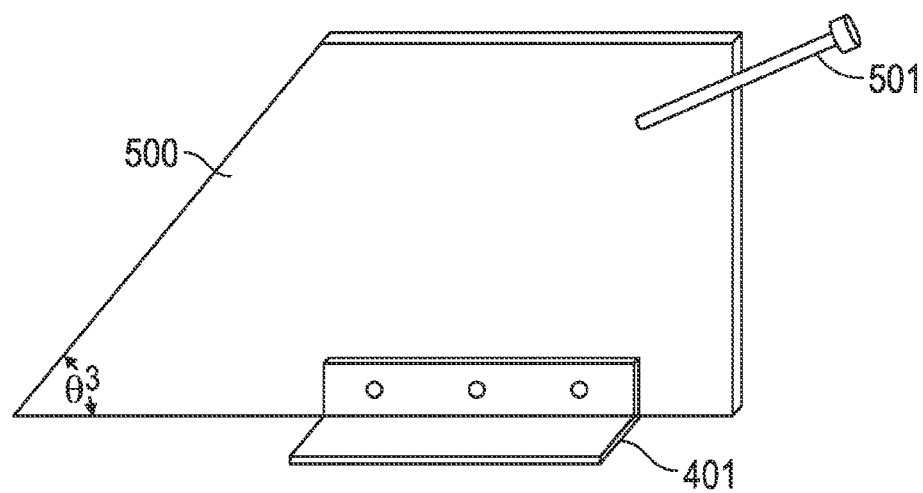
FIG. 8 depicts a back stop plate in an embodiment of the invention.

In an embodiment guide pin 501 permanently couples to back plate 500 (FIG. 8) but in another embodiment (FIG. 5) the pin loosely slides within conduit(s) 395 and between pins 102. For example, an embodiment includes a series of conduits such as conduit 395. This allows the user greater flexibility in the angle $\theta^2$ that may be achieved. It also allows the user to set a variety of different upper edge heights. In another embodiment the guide pin 501 may be oriented in a different direction and slide in a track instead of between pins 102. FIG. 8 illustrates how in one embodiment plate 500 may include two edges formed at angle $\theta^3$. In an embodiment $\theta^3$=60 degrees. As a result, this limits $\theta^1$ to 30 degrees because as plate 200 lowers downwards and plates 400 and 312 pivot about hinge/joint 310 and towards plate 311, plate 500 has an outer edge that will abut plate 311 and/or plate 200 to stop rotation of plate 400. By manipulating $\theta^3$ one can ensure, for example, that the operating or paving mode will project plate 400 at a desired angle (such as 30 degrees if so desired by the user or required by law/regulation).

A first example includes a device for creating a shaped surface along the edge of the road or paving area during the paving process in a manner that has advantages relative to existing devices. A second example includes a device that couples to a screed or screed extension or end gate which produces a shaped surface along the shoulder of the road or at the joint (seam) between lanes; and is independently both vertically and rotationally movable relative to the bias of the paving machine or its screed. A version of the second example can be configured to fit on either the left or right hand side of the paving machine. A version of the second example has compaction surface(s) as part of the forming element 700. A version of the second example is able to independently follow elevation changes along the shoulder or unpaved surface of the road. A version of the second example may be adjusted in the field so as to meet various operating conditions and paving requirements. A third example includes a device that couples to a screed or screed extension or end gate, which produces a shaped surface along the shoulder of the road or at the joint (seam) between lanes; and is independently both vertically and rotationally movable relative to the bias of the paving machine or its screed; and has compaction surface(s); and is able to independently follow elevation changes along the shoulder or unpaved surface of the road. A fourth example includes a pavement edger with a rotation axis (e.g., axis 310) that itself moves vertically independent of the screed (and perpendicular to the rotation axis itself).

The following examples pertain to further embodiments.

Example 1 includes a roadway paving apparatus comprising: a first plate coupled to a second plate via a first joint having at least 5 degrees of rotation about a first axis of rotation; and a resilient member, coupled to the first plate, including a downward bias directed along a vertical line of force orthogonal to the first axis of rotation; wherein (a) the second plate is configured to couple to a pavement forming shoe, and (b) the resilient member, the first and second plates, and the first joint are configured to simultaneously: (b)(i) rotate the second plate about the first axis of rotation from a non-horizontal position to a horizontal position, and (b)(ii) move the first joint vertically along the line of force. In an embodiment the first joint, such as joint 310, has a critical rotation of 20, 30, 40 or more degrees. The ability to rotate 5 or more degrees is critical in order to meet certain governmental regulations. For creating a safety edge the device must have an ability to rotate at least approximately 20 degrees. When creating a longitudinal center lane joint, the device may only need to rotate as little as 5 degrees. Spring 221 provides a downward bias vertically in line with direction 313 of FIG. 4. Joint 310 provides rotation for plate 400 about plate 200. Joint 310 moves up and down along direction 313. Also, in other embodiments the second plate may include a surface that acts as the paving shoe, thereby negating the need to couple to a shoe. The plates may be completely planar but are not necessarily planar and may have curved or bent portions (e.g., a leading edge of a shoe may be bent upwards from the trailing edge of the shoe in order to funnel material towards the smoothing rearward portion of the shoe).

Another version of Example 1 includes a roadway paving apparatus to couple to a screed that is coupled to an end gate, the apparatus comprising: a first plate coupled to a second plate via a first joint having at least 5 degrees of rotation about a first axis of rotation; and a resilient member, coupled to the first plate, including a downward bias directed along a vertical line of force orthogonal to the first axis of rotation; wherein (a) the second plate is configured to at least one of (a)(i) couple to a pavement forming shoe, and (a)(ii) include a lower surface that comprises a pavement forming shoe, (b) the resilient member, the first and second plates, and the first joint are configured to simultaneously: (b)(i) rotate the second plate about the first axis of rotation from a non-horizontal position to a horizontal position, and (b)(ii) move the first joint vertically along the line of force; and (c) the first joint is to move vertically and rotate independently of both the screed and the end gate. Such an embodiment does not include the actual screed or end gate. Such an embodiment includes the device itself (having the first and second plates, resilient member, and first joint), which can eventually be joined to, for example, a screed or screed extension (e.g., see FIG. 5). As stated above, the second plate may include apertures 402 with which it can couple to a shoe, like shoe 700. However, it may also use the plate itself as the shoe. A kit of second plates may include variously shaped second plates need to form various shoulder and interlane seem patterns. The phrase "the first joint is to move vertically and rotate independently of both the screed and the end gate" means the first joint, such as joint 310, can rotate the first and second plates (e.g., plate 400 with regard to plate 200) whether the screed or end gate is moving or is not moving, and the first joint, such as joint 310, can move vertically (e.g., up or down collinear with direction 313) whether the screed or end gate is moving or is not moving. This vertical movement and rotation of the first joint (e.g., joint 310) may be due the second plate (e.g., plate 400) encountering a change in elevation, such as a raised curb. In such a situation the joint may move vertically and pivot even if the end gate (e.g., end gate 10) and screed extension 5 do not encounter the obstacle and therefore do not move vertically.

Notably, in conventional paving machines the end gate 10 moves independently of screed/screed extension 5. For example, a user (e.g., paving crew member) manually adjusts a crank system to lower the end gate to approximate the surface to be paved. The end gate may then "ride" or move up and down to accommodate changes in surface height and does so independently of the screed.

Figure 6:
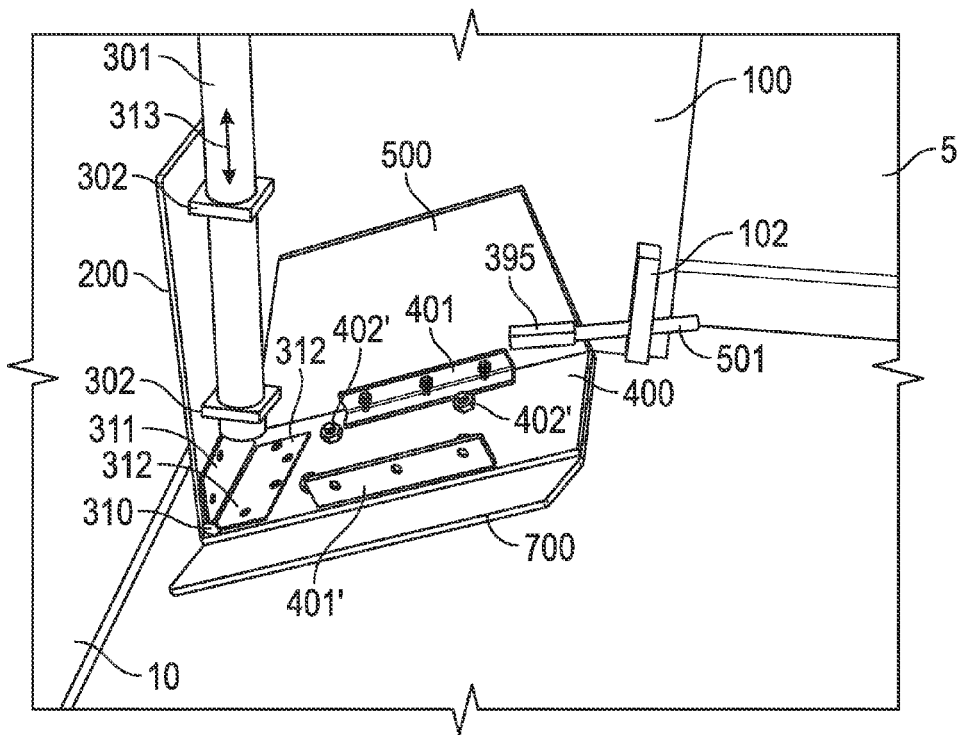

In example 2 the subject matter of the Example 1 can optionally include a second joint, having a second axis of rotation, coupled to the second plate; wherein the resilient member, the first and second plates, and the first and second joints are configured to simultaneously: (c)(i) rotate the second plate about the first and second axes of rotation, and (c)(ii) move the first joint vertically along the line of force. For example, any or all of conduit 395, pin 501, and pins 102 form a second joint in addition to joint 310. As can be seen in FIGS. 5 and 6, the plate 400 clearly moves down from FIG. 5 to FIG. 6. In so doing, plate 400 rotates about pivot or joint 310. As 310 drops vertically from FIG. 5 to FIG. 6, $\theta^2$ decreases. Also, as joint 310 drops vertically from FIG. 5 to FIG. 6 pin 501 clearly rotates as well. In FIG. 5 pin 501 slopes upwards from right to left but in FIG. 6 pin 501 slopes downward from right to left. Thus, plate 400 is actually rotating about two axes of rotation, both of which are horizontal and orthogonal to vertical line 313. Further, the rotation about two axes occurs simultaneously with downward movement of joint 310 from FIG. 5 to FIG. 6.

In example 3 the subject matter of the Examples 1-2 can optionally include wherein the second joint includes a conduit and a pin, wherein the pin slides horizontally as the second plate rotates about the second axis or rotation. In FIG. 5 the majority of exposed pin 501 is to the right of pins 102 but in FIG. 6 the minority of exposed pin 501 is to the right of pins 102, clearly showing horizontal movement of pin 501 as plate 400 rotates. As used herein, horizontal movement does not necessarily mean 100% movement in the horizontal direction but instead the vector of movement has a horizontal component >0. In an embodiment the second joint includes a conduit and a pin, wherein the pin slides horizontally as the second plate rotates about the second axis or rotation. In another embodiment "including a conduit" may address an embodiment that includes several conduits similar to conduit 395. The inclusion of a plurality of conduits, possibly vertically oriented with one another, may allow the user to select from among various settings/conduits that offer different rotation ranges (greater range, lesser range, same range but over a different span of angles). Also, in some embodiment the pin is fixed within the conduit but in other embodiments the pin move within the conduit. The ability to move the pin within the conduit may help better accommodate the device when the screed extension (to which the device is connected) is withdrawn inwards toward the center of the paving machine.

In example 4 the subject matter of the Examples 1-3 can optionally include a third plate configured to couple to the pin as the second plate rotates about the second axis or rotation. For example, plate 100 constitutes a third plate.

In example 5 the subject matter of the Examples 1-4 can optionally include wherein the third plate includes a first group of at least two pins, wherein the pin is configured to slide between the at least two pins of the first group. For example, pin 501 slides between pins 102.

In example 6 the subject matter of the Examples 1-5 can optionally include a second group of at least two pins, wherein the first group is included on a first side of the third plate and the second group is included on a second side of the third plate opposite the first side of the third plate. For example, in FIG. 11 two sets of pins allow plate 100 to be mounted on the right or left sides of a screed or screed extension.

In example 7 the subject matter of the Examples 1-6 can optionally include at least one of a screed and a screed extension connected to the third plate.

In example 8 the subject matter of the Examples 1-7 can optionally include wherein the screed includes a first surface facing the first and second plates and primarily included in a first plane orthogonal to the first and second axes of rotation.

In example 9 the subject matter of the Examples 1-8 can optionally include wherein the first joint is between the end gate and the second joint. Thus, the device can be situated within the screed box as shown in FIGS. 5 and 6 thereby not relying on gate 10 for alignment and/or an external heater for heating.

In example 10 the subject matter of the Examples 1-9 can optionally include the shoe, wherein the second plate includes at least one aperture to accommodate a fastener that fastens the shoe to the second plate. Plate 400 includes holes to which bolts are inserted to fasten show 700 to plate 400.

In example 11 the subject matter of the Examples 1-10 can optionally include wherein the second joint includes a conduit and a pin configured to slide within the conduit as the second plate rotates about the second axis or rotation. Thus, an embodiment such as the embodiment of FIGS. 5 and 6 show the pin stationary within conduit 395 other embodiments may allow the pin to slide within the conduit.

In example 12 the subject matter of the Examples 1-11 can optionally include wherein the resilient member includes at least one of a spring and a piston. For example, the piston may be a hydraulic piston.

In example 13 the subject matter of the Examples 1-12 can optionally include a second joint coupled to the second plate; wherein the resilient member, the first and second plates, and the first and second joints are configured to simultaneously: (c)(i) rotate the second plate about the first axis of rotation, (c)(ii) move the first joint vertically along the line of force; and (c)(iii) move at least a portion of the second joint horizontally. For example, in FIGS. 5 and 6 pin 501 (e.g., a portion of the second joint) slides horizontally as the second plate rotates about the second axis or rotation.

In example 14 the subject matter of the Examples 1-13 can optionally include. The structure of claim 1 comprising a second joint coupled to the second plate; wherein the resilient member, the first and second plates, and the first and second joints are configured to simultaneously: (c)(i) rotate the second plate about the first axis of rotation, and (c)(ii) move the first joint vertically along the line of force without moving the first joint horizontally. Thus, joint 310 just moves vertically thereby avoiding paving material waste like that found in space 392 of FIG. 3.

In example 15 the subject matter of the Examples 1-14 can optionally include a threaded member to raise and lower the first plate and the first joint.

In example 16 the subject matter of the Examples 1-15 can optionally include wherein the first joint is to automatically, without simultaneous user manipulation, move vertically and rotate in response to the second plate contacting an obstacle in a paving pathway the screed is traversing. Thus, while some conventional system may allow for a user to crank or manipulate a gear system to manipulate the second plate, doing so in not "automatic" and does not "move vertically and rotate in response to the second plate contacting an obstacle in a paving pathway the screed is traversing." Instead, such a system would move in response to user manipulation and not in response to "the second plate contacting an obstacle in a paving pathway the screed is traversing."

In example 17 the subject matter of the Examples 1-16 can optionally include wherein the second joint includes upper and lower retaining members and the second plate slides horizontally between the upper and lower retaining members as the second plate rotates about the second axis or rotation. While this is not shown in a figure, an embodiment does not necessarily require pin 501. For example, in an embodiment a portion of plate 400 can slide between two restraining members, such as pins 102 or elongated versions of pins 102. This joint would still allow pivoting of the "inside" edge of plate 400 as well as lateral or horizontal translation of plate 400 as plate 400 rotates and joint 310 rises or lowers along line of force 313. In an embodiment the bottom plate could contain a pin that slides in an arched slot in the back plate. In an embodiment there could be an extension spring that connects the bottom plate or back stop to the mounting plate. In an embodiment there may be just a bottom pin (instead of top and bottom pins 102). Such an embodiment may include a magnet to hold down the bottom plate and let it slide along the bottom pin.

Example 18 includes a roadway paving apparatus comprising: a first plate coupled to a second plate via a first joint that rotates about a first axis of rotation; a resilient member, coupled to the first plate, including a downward bias directed along a line of force non-parallel to the first axis of rotation; and a second joint that rotates about a second axis of rotation, wherein the second plate rotates about the first and second axes of rotation simultaneously with the first joint moving vertically along the line of force. In an embodiment the second plate rotates about the first and second axes of rotation simultaneously with the first joint moving vertically and collinear with the line of force.

Another version of Example 18 includes a roadway paving apparatus comprising: a first plate coupled to a second plate via a first joint that rotates about a first axis of rotation; and a resilient member, coupled to the first plate, including a downward bias directed along a line of force non-parallel to the first axis of rotation; wherein (a) the second plate couples to a pavement forming member, and (b) the second plate rotates about the first axis of rotation while the first joint moves vertically along the line of force.

In example 19 the subject matter of the Example 18 can optionally include wherein the second joint includes a member that slides horizontally as the second plate rotates about the first axis or rotation.

In example 20 the subject matter of the Examples 18-19 can optionally include a second joint that rotates about a second axis of rotation, wherein the first joint moves vertically along the line of force while at least a portion of the second joint moves horizontally.

In example 21 the subject matter of the Examples 18-20 can optionally include a second joint that rotates about a second axis of rotation, wherein the second plate rotates about the first axis of rotation, and while the first joint moves vertically along the line of force without moving horizontally.

Example 22 includes a roadway paving kit comprising: a first plate; a second plate; a first joint; and a resilient member; wherein after assembly of the kit (a) the first joint couples the first plate to the second plate and the first joint has at least 5 degrees of rotation about a first axis of rotation, (b) the resilient member includes a downward bias, when loaded, directed along a vertical line of force non-parallel to the first axis of rotation, (c) the resilient member, the first and second plates, and the first joint are configured to simultaneously: (d)(i) rotate the second plate about the first axis of rotation from a non-horizontal position to a horizontal position, and (d)(ii) move the first joint vertically along the line of force; and (e) the first joint moves vertically and rotates independently of both a screed and end gate when coupled to the screed.

In example 23 the subject matter of the Example 22 can optionally include a second joint having a second axis of rotation, wherein after assembly of the kit the second joint is coupled to the second plate; and the resilient member, the first and second plates, and the first and second joints are configured to simultaneously: (f)(i) rotate the second plate about the first and second axes of rotation, and (f)(ii) move the first joint vertically along the line of force.

In example 24 the subject matter of the Examples 22-23 can optionally include a second joint, wherein after assembly of the kit, the second joint is coupled to the second plate; and the resilient member, the first and second plates, and the first and second joints are configured to simultaneously: (f)(i) rotate the second plate about the first axis of rotation, (f)(ii) move the first joint vertically along the line of force; and (f)(iii) move at least a portion of the second joint horizontally.

In example 25 the subject matter of the Examples 22-24 can optionally include a second joint, wherein after assembly of the kit, the second joint is coupled to the second plate; and the resilient member, the first and second plates, and the first and second joints are configured to simultaneously: (f)(i) rotate the second plate about the first axis of rotation, and (f)(ii) move the first joint vertically along the line of force without moving the first joint horizontally.

While various joints have discussed above, alternative embodiments may include other joints (e.g., ball and socket joint, a durable fabric coupling two plates, a torsion spring that allows for radial movement) for either of the first and second joints in embodiments that require first and second joints. Some embodiments may include a single joint for rotation of plates. Also, while plates are addressed herein a plate is to be defined broadly and may include a portion of a box or other structure.

Some embodiments may not include a side plate like plate 200. For example, a swivel joint may be welded to the bottom plate very close to the radial axis. Instead of having a mounting plate, the components (e.g., yoke 104 and/or pins 102) could be mounted directly to the screed or screed extension.

The foregoing description of the embodiments of the invention has been presented for the purposes of illustration and description. It is not intended to be exhaustive or to limit the invention to the precise forms disclosed. This description and the claims following include terms, such as left, right, top, bottom, over, under, upper, lower, first, second, etc. that are used for descriptive purposes only and are not to be construed as limiting. For example, terms designating relative vertical position refer to a situation where a device side (or active surface) of a substrate or integrated circuit is the "top" surface of that substrate; the substrate may actually be in any orientation so that a "top" side of a substrate may be lower than the "bottom" side in a standard terrestrial frame of reference and still fall within the meaning of the term "top." The term "on" as used herein (including in the claims) does not indicate that a first layer "on" a second layer is directly on and in immediate contact with the second layer unless such is specifically stated; there may be a third layer or other structure between the first layer and the second layer on the first layer. The embodiments of a device or article described herein can be manufactured, used, or shipped in a number of positions and orientations. Persons skilled in the relevant art can appreciate that many modifications and variations are possible in light of the above teaching. Persons skilled in the art will recognize various equivalent combinations and substitutions for various components shown in the Figures. It is therefore intended that the scope of the invention be limited not by this detailed description, but rather by the claims appended hereto.

What is claimed is:

1. A roadway paving apparatus to couple to a screed that is coupled to an end gate, the apparatus comprising:
    a first plate coupled to a second plate via a first joint having at least 5 degrees of rotation about a first axis of rotation;
    a second joint, having a second axis of rotation, coupled to the second plate; and
    a resilient member, coupled to the first plate, to provide a downward bias directed along a vertical line of force orthogonal to the first axis of rotation;
    wherein:
        (a) the second plate is configured to at least one of (a)(i) couple to a pavement forming shoe, and (a)(ii) include a lower surface that comprises a pavement forming shoe,
        (b) the resilient member, the first and second plates, and the first and second joints are configured to simultaneously: (b)(i) rotate the second plate about the first axis of rotation, from a non-horizontal position to a substantially horizontal position, and the second axis of rotation, and (b)(ii) move the first joint vertically along the line of force;
        (c) the first joint is to move vertically and rotate independently of both the screed and the end gate; and
        (d) the first joint is to automatically, without simultaneous user manipulation, move vertically and rotate in response to the second plate contacting an obstacle in a paving pathway the screed is traversing.

2. The apparatus of claim 1, wherein the second joint includes a conduit and a pin, wherein the pin slides horizontally as the second plate rotates about the second axis of rotation.

3. The apparatus of claim 2 comprising a third plate configured to couple to the pin as the second plate rotates about the second axis of rotation.

4. The apparatus of claim 3, wherein the third plate includes a first group of at least two pins, wherein the pin is configured to slide between the at least two pins of the first group.

5. The apparatus of claim 4, comprising a second group of at least two pins, wherein the first group is included on a first side of the third plate and the second group is included on a second side of the third plate opposite the first side of the third plate.

6. The apparatus of claim 3 comprising at least one of the screed, a screed extension, and the end gate, wherein at least one of the screed and the screed extension is connected to the third plate.

7. The apparatus of claim 6, wherein the screed includes a first surface facing the first and second plates and primarily included in a first plane orthogonal to the first and second axes of rotation.

8. The apparatus of claim 7, wherein the first joint is between the end gate and the second joint.

9. The apparatus of claim 1 comprising the shoe, wherein the second plate includes at least one aperture to accommodate a fastener that fastens the shoe to the second plate.

10. The apparatus of claim 1, wherein the second joint includes a conduit and a pin configured to slide within the conduit as the second plate rotates about the second axis of rotation.

11. The apparatus of claim 1, wherein the resilient member includes at least one of a spring and a piston.

12. The apparatus of claim 1 wherein the resilient member, the first and second plates, and the first and second joints are configured to simultaneously: (e)(i) rotate the second plate about the first axis of rotation, (e)(ii) move the first joint vertically along the line of force; and (e)(iii) move at least a portion of the second joint horizontally.

13. The apparatus of claim 1 wherein the resilient member, the first and second plates, and the first and second joints are configured to simultaneously: (e)(i) rotate the second plate about the first axis of rotation, and (e)(ii) move the first joint vertically along the line of force without moving the first joint horizontally.

14. The apparatus of claim 1 comprising a threaded member to raise and lower the first plate and the first joint.

15. The apparatus of claim 1, wherein the second joint includes upper and lower retaining members and the second plate slides horizontally between the upper and lower retaining members as the second plate rotates about the second axis of rotation.

16. A roadway paving apparatus comprising:
a first plate coupled to a second plate via a first joint that rotates about a first axis of rotation;
a resilient member, coupled to the first plate, to provide a downward bias directed along a line of force non-parallel to the first axis of rotation; and
a second joint that rotates about a second axis of rotation, wherein the second plate rotates about the first and second axes of rotation simultaneously with the first joint moving vertically along the line of force;
wherein the first joint moves vertically along the line of force while at least a portion of the second joint moves horizontally.

17. The apparatus of claim 16, wherein the second joint includes a member that slides horizontally as the second plate rotates about the first axis of rotation.

18. The apparatus of claim 16, wherein the second plate rotates about the first axis of rotation while the first joint moves vertically along the line of force without moving horizontally.

19. A roadway paving kit comprising:
a first plate;
a second plate;
a first joint;
a second joint; and
a resilient member;
wherein after assembly of the kit:
(a) the first joint couples the first plate to the second plate and the first joint has at least 5 degrees of rotation about a first axis of rotation,
(b) the resilient member includes a downward bias, when loaded, directed along a vertical line of force non-parallel to the first axis of rotation,
(c) the second joint is coupled to the second plate;
(d) the resilient member, the first and second plates, and the first and second joints are configured to simultaneously: (d)(i) rotate the second plate about the first axis of rotation, from a non-horizontal position to a substantially horizontal position, (d)(ii) move the first joint vertically along the line of force; (d)(iii) move at least a portion of the second joint horizontally, and
(e) the first joint moves vertically and rotates independently of both a screed and end gate when coupled to the screed.

20. The kit of claim 19, wherein the second joint has a second axis of rotation and after assembly of the kit the resilient member, the first and second plates, and the first and second joints are configured to simultaneously: (f)(i) rotate the second plate about the first and second axes of rotation, and (f)(ii) move the first joint vertically along the line of force.

21. The kit of claim 19 wherein after assembly of the kit the resilient member, the first and second plates, and the first and second joints are configured to simultaneously: (f)(i) rotate the second plate about the first axis of rotation, and (f)(ii) move the first joint vertically along the line of force without moving the first joint horizontally.

22. A roadway paving apparatus comprising:
a first plate coupled to a second plate via a first joint that rotates about a first axis of rotation;
a resilient member, coupled to the first plate, to provide a downward bias directed along a line of force non-parallel to the first axis of rotation; and
a second joint that rotates about a second axis of rotation, wherein the second plate rotates about the first and second axes of rotation simultaneously with the first joint moving vertically along the line of force;
wherein the second plate rotates about the first axis of rotation while the first joint moves vertically along the line of force without moving horizontally.

23. The apparatus of claim 22, wherein the second joint includes a member that slides horizontally as the second plate rotates about the first axis or rotation.

24. A roadway paving kit comprising:
a first plate;
a second plate;
a first joint;
a second joint; and
a resilient member;
wherein after assembly of the kit:
(a) the first joint couples the first plate to the second plate and the first joint has at least 5 degrees of rotation about a first axis of rotation;
(b) the resilient member includes a downward bias, when loaded, directed along a vertical line of force non-parallel to the first axis of rotation;
(c) the second joint is coupled to the second plate;
(d) the resilient member, the first and second plates, and the first and second joints are configured to simultaneously: (d)(i) rotate the second plate about the first axis of rotation, and (d)(ii) move the first joint vertically along the line of force without moving the first joint horizontally; and
(e) the first joint moves vertically and rotates independently of both a screed and end gate when coupled to the screed.

25. The kit of claim 24 wherein after assembly of the kit the resilient member, the first and second plates, and the first and second joints are configured to simultaneously: (f)(i) rotate the second plate about the first axis of rotation, and (f)(ii) move at least a portion of the second joint horizontally.

* * * * *